July 12, 1960  H. G. KAUFMAN  2,944,349
COMPARISON DEVICE
Filed Sept. 22, 1958
FIG.1.
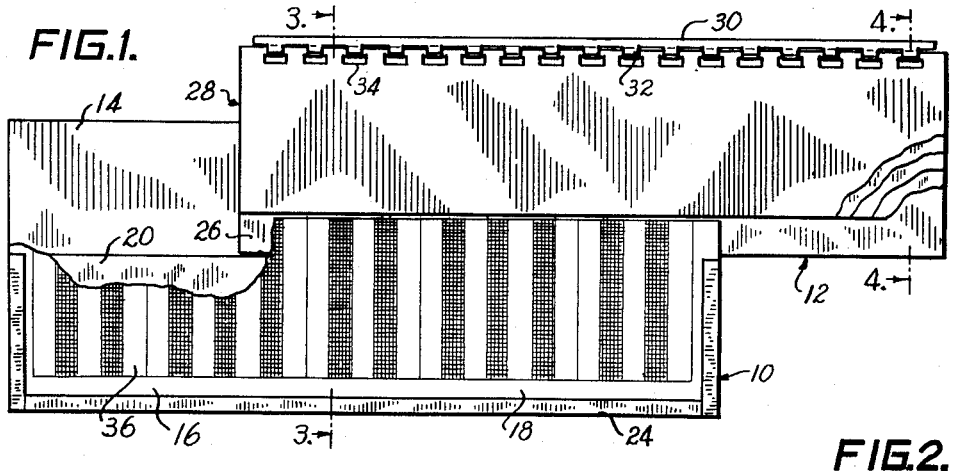
FIG.2.
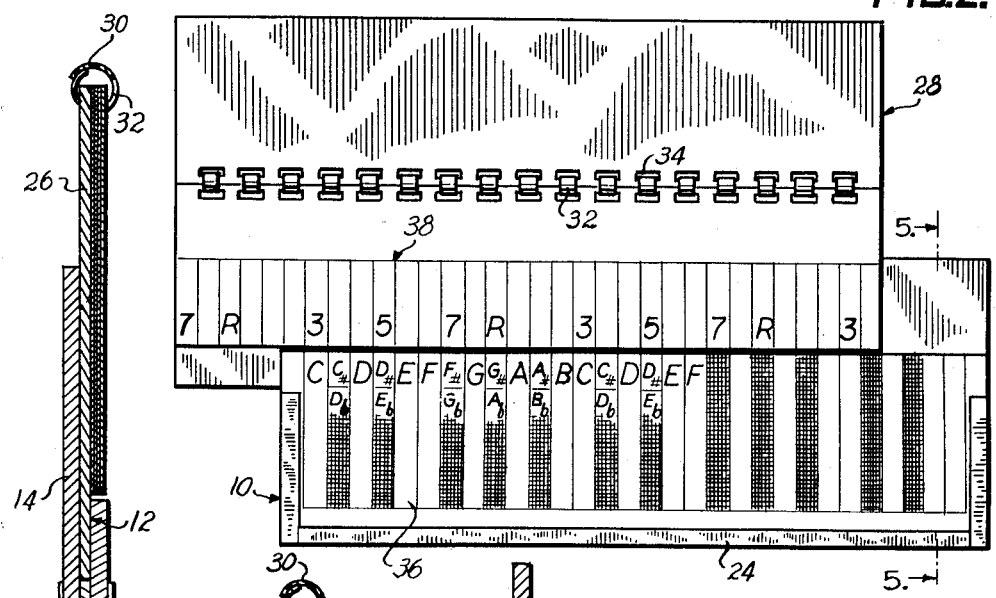
FIG.3.
FIG.4. FIG.5.
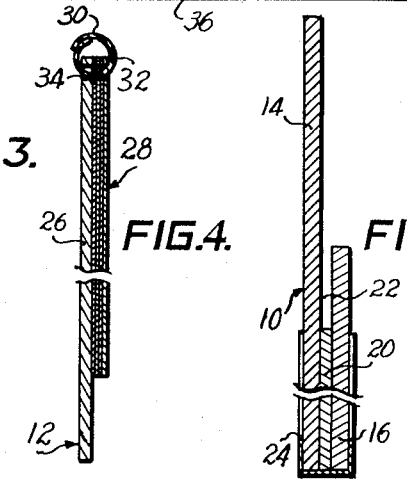
INVENTOR.
Harold G. Kaufman
BY
ATTORNEY.

United States Patent Office 2,944,349
Patented July 12, 1960

2,944,349

COMPARISON DEVICE

Harold G. Kaufman, Kansas City, Mo., assignor to Kaufman Advertising Co., Inc., Kansas City, Mo., a corporation of Missouri Filed Sept. 22, 1958, Ser. No. 762,405

1 Claim. (Cl. 35—54)

This invention relates to a comparator adaptable for a multitude of varied uses whenever it becomes necessary or desirable to compute, measure, or otherwise arrive at an answer to a given problem.

It is the most important object of the present invention to provide a comparison device that makes possible the use of an infinitely large number of separate charts that may be selectively associated with basic reference data to the end that, through use of a relatively small, light-weight, inexpensive instrument, the user thereof may make the necessary comparisons and arrive at certain conclusions quickly, easily and in an understandable manner.

It is an important object of the present invention to provide a comparator that employs relatively movable sections, one of which in turn has a number of separate individual charts that may be swung into position associated with certain reference data so that comparisons may be made as the section having the selected chart is shifted relative to the base section.

Another important object of the instant invention is to provide a comparison device having a base provided with a groove for slidably receiving a plate for rectilinear reciprocation therealong, the plate in turn having a set of tablets hingedly mounted thereon for swinging movement into associated relationship to the base so that comparison may be made between reference data on the base and certain corresponding material appearing on the tablets in the form of charts, graphs or the like.

In the drawing:

Fig. 1 is a top plan view of a comparison device made pursuant to my present invention illustrating the two sections thereof relatively displaced, parts being broken away for clearness.

Fig. 2 is a view similar to Fig. 1 showing the sections of the device displaced in the opposite direction and illustrating one of the inner tablets associated with certain reference data on the base.

Fig. 3 is an enlarged, cross-sectional view taken on line 3—3 of Fig. 1.

Fig. 4 is an enlarged, cross-sectional view taken on line 4—4 of Fig. 1; and

Fig. 5 is an enlarged, cross-sectional view taken on line 5—5 of Fig. 2.

As is clear in the drawing, the instrument forming the subject matter of the instant invention consists essentially of two readily separable, primary parts or sections broadly designated by the numerals 10 and 12 respectively and adapted to be shifted relatively as is obvious from Figs. 1 and 2.

Base section 10 is of laminated construction including, therefore, an elongated, preferably rectangular back 14, a similarly-shaped front panel 16 provided with an outermost or top surface 18, and a spacer 20 that may likewise be of much of the same shape as laminae 14 and 16.

Panel 16 is appreciably narrower than back 14 and the spacer 20 is still narrower whereby to present a groove 22 between back 14 and panel 16 open at its ends and coextensive in length with the base 10. Figs. 3 and 5 clearly illustrate the disposition of the spacer 20 interleaved between back 14 and panel 16, and such three parts making up the base 10, may be interconnected in any suitable manner such as by use of binding tape 24 along the lower edge of base 10 and along the ends thereof, terminating short of groove 22.

The movable section 12 of the comparator includes a supporting plate 26 that may likewise be rectangular in shape and adapted at its lowermost, longitudinal marginal edge to slidably fit within the groove 22 as best seen in Fig. 3. Consequently, as the section 12 is caused to reciprocate along a rectilinear path of travel within the groove 22, the plate 26 will also slide on that part of the front face of back 14 which protrudes upwardly beyond the spacer 20.

It is to be noted that the plate 26 may extend upwardly beyond the upper, longitudinal edge of the back 14 and plate 26 carries a set of tablets 28 through the medium of an elongated hinge 30 along the uppermost, longitudinal edge of the plate 26.

The hinge 30 chosen for illustration is of conventional character now commonly employed in many fields, the same having a plurality of spaced hinge barrels 32 within elongated slots 34 formed in each of the tablets 28 and in the plate 26. The width of each tablet 28 is such that the longitudinal edges thereof remote from hinge 30 are disposed in close juxtaposition to the upper edge of the panel 16 when the tablets 28 are in position operably associated with the panel 16. Under such conditions of use, therefore, the lower edges of the tablets 28 may be in edge-to-edge sliding abutment to the upper edge of panel 16.

The nature of the material printed or otherwise displayed on the panel 16 and on the tablets 28, depends entirely upon the use to which the comparator is placed. Therefore, by way of example only, Figs. 1 and 2 illustrate fragmentarily, certain material that adapts the device for use in the field of music or musical instruction. Hence, reference data 36 on the surface 18 of panel 16 may represent the keys of a piano or similar instrument and be designated or identified in the manner illustrated in Fig. 2.

On the other hand, each of the tablets 28 may be provided with a chart 38 usable in connection with the data 36 to assist a musician or a student in music, to determine all chords in all positions.

In use, therefore, the operator simply selects the desired tablet 28 and swings the same into position associated with the panel 18 so that the chart 38 thereof may be compared with the reference data 36. Thereupon, the plate 26 is shifted along the groove 22 and the back 14 to properly align the chart or graph 38 with the data displayed on the surface 18 of panel 16.

Further explanation of the particular data 36 and chart 38 shown in the drawings, is unnecessary since the manner of use of the comparison device becomes quite apparent from the above explanation of its components. Further, as above indicated, the material appearing on the surface 18 and on the several tablets 28, whether in the form of charts, maps, graphs or other arrangements, may vary considerably, depending upon the use to which the instrument is to be placed.

Manifestly also, the form and construction of the comparison device is such as to permit the use of any number of tablets 28, since the same can be easily swung upwardly and rearwardly out of the way as shown in Fig. 2 so as to exhibit the selected tablet 28 for comparison purposes as above outlined.

Having thus described the invention what is claimed as new and desired to be secured by Letters Patent is:

A comparator comprising a base having a generally rectangular back, a generally rectangular panel of lesser width than the back secured to the latter in forwardly spaced, parallel relation thereto, and a spacer mounted between the back and the panel, said back including a portion extending transversely in one direction beyond one longitudinal edge of the panel, said spacer having a linear edge surface between the back and the panel, said surface being parallel to said one edge of the panel and offset therefrom in the opposite direction; reference data displayed on the front of the panel; a plate having a linear edge slidably supported on said surface of the spacer, a marginal part of the front face of the plate adjacent said edge of the latter slidably engaging the panel, a remaining part of the front face of the plate extending transversely in said one direction beyond said one edge of the panel, a part of the rear face of the plate slidably engaging said portion of the back; a set of generally rectangular tablets each having a top and a bottom edge; means hingedly mounting said tablets adjacent the top edge of the latter upon said remaining part of the front face of the panel, each of said tablets being selectively swingable into an operative position disposing its front face in generally coplanar relationship to the front face of the panel and its bottom edge in proximate and parallel relationship to said one edge of the panel; and a different chart displayed on the front face of each tablet respectively and bearing a corresponding relation to said data, whereby any of said charts may be compared with said data in any position of relative reciprocated relationship therebetween.

References Cited in the file of this patent

UNITED STATES PATENTS

| | | |
|---|---|---|
| 201,030 | Mason | Mar. 5, 1878 |
| 1,323,779 | McDade | Dec. 2, 1919 |
| 2,181,588 | Purvis | Nov. 28, 1939 |
| 2,663,211 | Wallace | Dec. 22, 1953 |
| 2,718,169 | Barnes | Sept. 20, 1955 |